United States Patent [19]

Higashi et al.

[11] 4,429,021
[45] Jan. 31, 1984

[54] CHROMIUM-PLATED STEEL STRIP HAVING EXCELLENT WELDABILITY AND RESISTANCE TO CORROSION

[75] Inventors: Mitsuo Higashi; Jyun-ichi Morita; Kenzi Koyama, all of Chita; Mitsuo Yoshida, Tokai, all of Japan

[73] Assignee: Nippon Steel Corporation, Japan

[21] Appl. No.: 328,699

[22] Filed: Dec. 8, 1981

[30] Foreign Application Priority Data

Dec. 29, 1980 [JP] Japan .................... 55-187719

[51] Int. Cl.³ .................... B32B 15/04; B32B 15/18
[52] U.S. Cl. .................... 428/629; 428/639; 428/646; 428/648; 428/666; 428/679; 428/680; 428/935; 220/456
[58] Field of Search .................... 220/456; 428/629, 632, 428/633, 639, 648, 646, 666, 667, 678, 679, 680, 935; 148/31.5

[56] References Cited

U.S. PATENT DOCUMENTS

| | | | |
|---|---|---|---|
| 3,077,421 | 2/1963 | Budininkas | 428/679 |
| 3,978,803 | 9/1976 | Asano et al. | 428/626 |
| 4,035,248 | 7/1977 | Asano et al. | 428/632 |
| 4,205,120 | 5/1980 | Morizot et al. | 360/136 |

OTHER PUBLICATIONS

Lyman, T., et al., ed.; *Metals Handbook*, vol. 2, Am. Soc. for Metals, p. 547, TA472A3 (1964).
Silman, H., et al.; *Protective and Decorative Coatings for Metals*, p. 556, (1978).
Lowenheim, F. A.; *Modern Electroplating* 3rd ed., pp. 710-729, (1974).

*Primary Examiner*—Michael L. Lewis
*Attorney, Agent, or Firm*—Wenderoth, Lind & Ponack

[57] ABSTRACT

A chromium-plated steel strip having an excellent weldability and a satisfactory resistance to corrosion, comprises a steel strip substrate, a base layer consisting of an amorphous metallic material, for example, Ni-P or Ni-B alloy, in an amount of 3 to 500 mg/m², an intermediate layer consisting of tin in an amount of 2.8 g/m² or less, and a surface layer consisting of metallic chromium and hydrated chromium oxide in an amount of 5 to 150 mg/m² and 3 to 30 mg/m², respectively.

5 Claims, 1 Drawing Figure

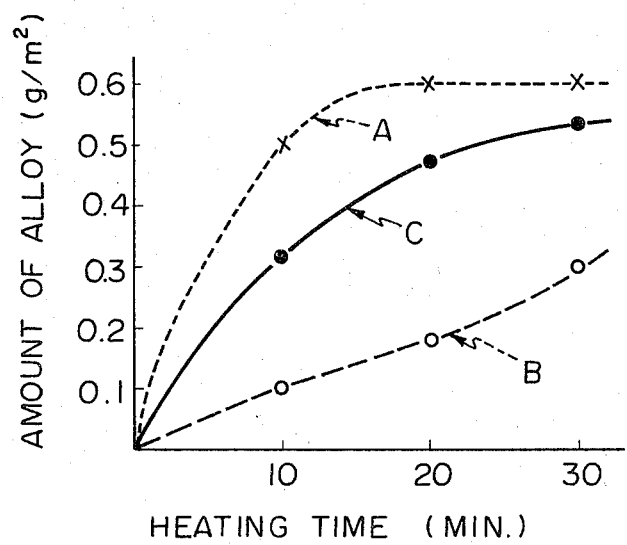

CHROMIUM-PLATED STEEL STRIP HAVING EXCELLENT WELDABILITY AND RESISTANCE TO CORROSION

FIELD OF THE INVENTION

The present invention relates to a chromium-plated steel strip having excellent weldability and resistance to corrosion and a method for producing the same. Particularly, the present invention relates to a chromium-plated steel strip which exhibits an excellent seam weldability and a superior resistance to corrosion and, is useful for beverage cans and general cans, and a method for producing the same.

BACKGROUND OF THE INVENTION

In recent years, various processes for producing cans and other welded containers have been developed. Conventional cans made by soldering a tin-plated steel sheet exhibit excellent quality and reliability and, therefore, are widely used for containing various materials. However, the conventional soldered cans are disadvantageous in the following items.

1. When a solder consisting of pure tin is used, the cost of the soldering procedure is high.
2. When a solder consisting of a lead-tin alloy is used in order to reduce the soldering cost or to enhance the solderability, sometimes a portion of the lead bleeds into the material contained in the can. This causes the contained material to become contaminated and, if the contained material is a food product, the product, when ingested, could be injurious to the health of that person.
3. Also, in the case where the tin-plated steel sheet is soldered, it is necessary that the plated tin layer have a large weight of 2.8 g/m$^2$ or more. That is, the plated tin layer should have a large thickness and, therefore, is expensive.

In order to produce cans having a satisfactory quality at a reduced cost, various types of steel materials and welding processes have been remarkably developed. That is, in place of the soldering procedure, various seamwelding processes have been developed, for example, the Soudronic welding process or the Conoweld welding process. In order to enjoy the advantages of the seamwelding processes as much as possible, it is necessary to reduce the amount of the plated tin to a level of 5.6 g/m$^2$ or less to decrease the cost of the can. However, the reduction in the thickness of the plated tin layer causes the resultant can to exhibit an unsatisfactory resistance to corrosion and, therefore, sometimes, to be practically useless.

Usually, the welding property of the tin-plated steel sheet is very good as long as the amount of the plated tin is 1.12 g per m$^2$ of each surface of the steel substrate. That is, when a can made from the above-mentioned tin-plated steel sheet is subjected to the Soudronic seamwelding procedure at a welding rate of 50 m/min, substantially no expulsion, surface flash and splash are formed on the welded surface of the can and the resultant weld exhibits a satisfactory strength. Also, a substantially continuous nugget is formed in the weld along the welding direction, and the air-tightness of the resultant seam in the can is satisfactory. However, as stated above, the smaller the amount of the plated tin layer on the steel substrate, the poorer the resistance of the resultant tin-plated steel sheet to corrosion. Therefore, it is desirable to develop a new type of tin-plated steel sheet having a relatively small amount of the plated tin layer and exhibiting a satisfactory resistance to corrosion and an excellent weldability.

The disadvantage of the tin-plated steel sheet having a thin plated tin layer, which has an unsatisfactory resistance to corrosion, can be eliminated by applying a cathodic treatment to the surface of the thin tin layer in a plating bath comprising mainly chromic acid so as to form a coating layer consisting essentially of metallic chromium and hydrated chromium oxide on the tin layer.

Generally, it is known that when the metallic chromium-hydrated chromium oxide coating layer is further coated with a paint layer, the resultant coated steel strip exhibits an excellent bonding property to the paint coating layer and a superior resistance to corrosion under the paint coating layer, to such a great degree that the above-mentioned properties can not be expected of the conventional tin-plated steel strip. The above-mentioned properties are practically provided by conventional steel strips electrolytically treated with a chromic acid solution, for example, CAN SUPER which is a trademark of a chromic acid-treated steel strip made by NIPPON STEEL CORP. JAPAN.

However, the electrolytic chromic acid-treatment applied to the tin-plated steel strip sometimes causes the resultant treated steel strip to exhibit an unsatisfactory seamweldability, for example, in the Soudronic seamwelding procedure.

According to the results of the inventor's research on the welding procedure of the steel strip which has been plated with tin and, then, electrolytically treated with the chromic acid solution, it is known that when the amount of tin, which is free from a tin-iron alloy, is 0.1 g/m$^2$ or more, preferably, 0.3 g/m$^2$ or more, the steel strip exhibits a satisfactory seamweldability.

When the seamwelding process is started, the free tin, which is located under the coated chromium layer and which has a relatively low melting point, is melted in the initial stage of the seamwelding procedure. In this stage, the coated chromium layer and the plated tin layer are pressed by an electrode wire of the seamwelding apparatus. Therefore, the coated chromium layer and the plated tin layer in the weld are discharged to the outside of the weld, so that a satisfactorily seamwelded product is obtained.

Practically, the steel strip which has been plated with tin and, then, treated with the electrolytic chromic acid solution, is coated with paint and, then, heated at a temperature of 190° to 210° C. for 20 to 40 minutes to cure the paint layer. During this heating procedure, the free tin in the plated tin layer alloys with iron in the steel strip substrate to form FeSn$_2$.

Usually, the heating procedure results in the formation of 0.3 to 0.6 g/m$^2$ of the Sn-Fe alloy in the plated tin layer, before the heating procedure is applied thereto, is, for example, 0.5 g/m$^2$, the entire amount of tin in the plated tin layer may be converted to a Sn-Fe alloy by the heating procedure. The Sn-Fe alloy has a high melting point and a lower electroconductivity than that of the free tin. Therefore, when the paint coated steel strip is subjected to the seamwelding procedure at a high speed, the Sn-Fe alloy results in the undesirable formation of expulsion, surface flash and splash.

However, even if the Sn-Fe alloy is contained in the plated tin layer, as long as the amount of the free tin in the plated tin layer is 0.1 g/m$^2$ or more, the resultant paint coated steel strip exhibits a satisfactory seamweldability. Also, it is known that after a steel strip is electroplated with tin, the resultant tin layer is subjected to a flow treatment to make the appearance of the tin-plated steel strip better. This flow treatment is also effective for alloying the tin with iron. The resultant Sn-Fe alloy has a dense structure and, therefore, is effective for enhancing the resistance of the steel strip to corrosion.

However, if no flow treatment is applied to the tin layer, it is necessary to apply another treatment to the steel strip in order to enhance the resistance of the steel strip to corrosion.

SUMMARY OF THE INVENTION

An object of the present invention is to provide a chromium-plated steel strip having an excellent weldability and a superior resistance to corrosion and a method for producing the same.

The above-mentioned object can be attained by the chromium-plated steel strip of the present invention, which comprises:

a steel strip substrate;

an amorphous metal base layer formed on the substrate in an amount of 3 to 500 mg per m$^2$ of the substrate;

an electroplated tin intermediate layer formed on the substrate of the base layer in an amount of 2.8 g or less per m$^2$ of the substrate; and;

a hydrated chromium oxide-containing surface layer coated on the intermediate layer in an amount of 3 to 30 mg per m$^2$ of said substrate.

The above-mentioned chromium-plated steel strip can be produced by the method of the present invention which comprises the steps of:

pickling the steel strip substrate;

plating the pickled surface of the substrate with an amorphous metal base layer in an amount of 3 to 500 mg per m$^2$ of the substrate;

electroplating the base layer with a tin intermediate layer, in an amount of 2.8 g or less per m$^2$ of the substrate, and then;

coating the surfaces of the intermediate layer with a surface layer which contains 5 to 150 mg of metallic chromium and 3 to 30 hydrated chromium oxide per m$^2$ of said substrate.

BRIEF DESCRIPTION OF THE DRAWING

The drawing is a graph showing the relationships between the heating times applied to, and the amount of Sn-Fe alloys produced on, three different amorphous metal base layers A, B and C.

DETAILED DESCRIPTION OF THE INVENTION

In the chromium-plated steel strip of the present invention, an amorphous metal base layer is formed on the surface of the steel strip substrate, a plated tin intermediate layer is formed on the base layer and a hydrated chromium oxide-containing surface layer is formed on the surface of the intermediate layer. The above-mentioned amorphous metal base layers on the steel strip substrate are effective for preventing the undesirable formation of a Sn-Fe alloy when the steel strip is coated with paint (lacquer) and, then heated at an elevated temperature to cure the resultant paint layer. The prevention of the formation of the Sn-Fe alloy is effective for improving the seamweldability of the paint-coated steel strip. Also, the hydrated chromium oxide-containing surface layer is effective for protecting the steel strip from corrosion.

In the chromium-plated steel strip of the present invention, it is important that the amorphous metal base layer be present in an amount of 3 to 500 mg, preferably, from 15 to 50 mg, per m$^2$ of the substrate. When the amount of the amorphous metal base layer is less than 3 mg/m$^2$, the resultant base layer cannot be a barrier effective for preventing the undesirable formation of the Sn-Fe alloy. Also, when the amount of the amorphous metal base layer is more than 500 mg/m$^2$, the effect of the resultant base layer in the prevention of the Sn-Fe alloy formation is similar to that of the base layer having a weight of 500 mg/m$^2$. If the base layer consists of more than 500 mg/m$^2$ of an amorphous nickel alloy, the resultant coated steel strip sometimes exhibits an unsatisfactory reduced resistance to sulfide.

The amorphous metal base layer can be formed usually by a chemical (non-electrolytic) plating process. However, an amorphous nickel alloy layer, containing a relatively large amount of an alloying element, for example, P or B, can be produced by an electrolytic plating process.

For example, amorphous Ni-P alloy base layers can be produced by a non-electrolytic plating process in which sodium hypophosphite is used as a reducing agent. Also, amorphous Ni-B alloy base layers can be produced by a non-electrolytic plating process, wherein an amine borane or sodium boranate is used as a reducing agent. In order to obtain 3 to 500 mg/m$^2$ of the amorphous Ni-P or Ni-B alloy base layers, a steel strip substrate which has been degreased and pickled, is immersed in the above-mentioned non-electrolytic (chemical) plating liquid for 1 to 300 seconds.

Otherwise, the amorphous metal base layer can be prepared by an electrolytic plating method. For example, amorphous Ni-P alloy base layers can be produced by using a electrolytic plating liquid which has been prepared by adding a proper amount of phosphorous acid into a watts bath.

For example, amorphous Ni-P alloy base layers can be produced on the surfaces of a steel strip which has been electrolytically degreased and pickled, by immersing the steel strip in an aqueous solution containing 50 g/l of nickel chloride, 10 g/l of sodium hypophosphite and 10 g/l of sodium citrate at a temperature of about 85° C. for 3 seconds. The resultant amorphous Ni-P alloy base layers comprises, for example, 25 mg of nickel and 2.0 mg of phosphorus per m$^2$ of the substrate. The amorphous Ni-P alloy base layer is washed with water and is then subjected to a conventional tin-plating process in which, for example, the Ni-P alloy-plated steel strip is immersed as a cathode in a conventional aqueous sulfate bath at a temperature of 45° C. while applying an electric current to the bath at a current density of 30 A/dm$^2$ for 0.3 seconds. The plated tin intermediate layer in an amount of 0.5 g per m$^2$ of the substrate are formed. The resultant tin-plated steel strip is subjected to a chromic acid treatment in which the tin-plated steel strip is immersed in an aqueous solution containing 100 g/l of chromic acid anhydride and 1.0 g/l of sulfuric acid at a temperature of 45° C. and an electric current is applied between a cathode consisting of the tin-plated steel strip and an anode consisting of an alloy of 96% of lead and 4% of tin, at a current density of 30 A/dm$^2$ for 0.2 seconds. The resultant coating surface layer contains 13 mg of metallic chromium and 12 mg, in terms of metallic chromium, of hydrated chromium oxide.

The resultant chromium-plated steel strip of the present invention exhibits a satisfactory seamweldability and corrosion resistance, even after being heated at an elevated temperature of 200° C. or more. In another example, a chromium-plated steel strip of the present invention, in which a steel strip is coated with an amorphous nickel-boron alloy base layer in an amount of 55 mg per m$^2$ of the substrate, with tin intermediate layer in an amount of 0.3 g per m$^2$ of the substrate and, then, with surface layer comprising 10 mg of metallic chromium and 10 mg, in terms of metallic chromium, of hydrated chromium oxide, exhibits a satisfactory seamweldability and corrosion resistance, even after the plated steel strip is heated at a temperature of 210° C. for 30 minutes.

The tin intermediate layer may be formed by any conventional tin-layer forming method. Also, the hydrated chromium oxide-containing surface layer may be formed by any conventional chromic acid-treating methods.

In the present invention, it is indispensable that the surfaces of the steel strip substrate be coated with amorphous metal base layer in an amount of 3 to 500 mg per m$^2$ of the substrate. If the base layer is made of crystalline metal or if no base layer is applied to the steel strip substrate, and, then, a tin plating procedure is applied onto the steel strip substrate, the tin layer is easily converted into a Sn-Fe based alloy layer by heating it at an elevated temperature. This phenomenon is clearly illustrated in the accompanying drawing.

The drawing shows the relationship between the heating time applied to three different chromium-plated steel strip samples A, B and C and the amount of Sn-Fe alloy produced in the samples A, B and C.

The sample A was produced by the following method.

A steel strip substrate was electroplated by using a Watts bath containing 245 g/l of NiSO$_4$.6H$_2$O, 45 g/l of NiCl$_2$.6H$_2$O and 30 g/l of H$_3$BO$_3$. The resultant base layer consisted of 50 mg/m$^2$ of crystalline nickel film. The crystalline structure of the nickel film was confirmed by means of an electron diffraction measurement.

The surface of the nickel plated steel strip was plated with 0.6 g/m$^2$ of tin intermediate layer and, then, with a hydrated chromium oxide-containing surface layer each comprising 8 mg of metallic chromium and 9 mg, in terms of metallic chromium, of hydrated chromium oxide per m$^2$ of each surface of the steel strip substrate.

The sample B was prepared as follows. The same steel strip substrate as that of the sample A was electroplated using an aqueous plating liquid containing 245 g/l of NiSO$_4$.6H$_2$O, 45 g/l of NiCl$_2$.6H$_2$O, 30 g/l of H$_3$BO$_3$ and 10 g/l of H$_3$PO$_3$. The resultant base layer consisted of an amorphous Ni-P alloy comprising 53 mg of nickel and 6 mg of phosphorus per m$^2$ of the substrate. The amorphous structure of the resultant base layer was confirmed by the electron diffraction measurement.

The surface of the nickel alloy coated steel substrate was coated with tin intermediate layer, having a weight of 0.6 g of tin, and with a hydrated chromium oxide-containing surface layer, comprising 8 mg of metallic chromium and 9 mg, in terms of metallic chromium, of hydrated chromium oxide, per m$^2$ of the substrate.

The sample C was prepared as follows. The same steel substrate was that of sample A was plated with 0.6 g/m$^2$ of a tin layer and, then, with a hydrated chromium oxide-containing surface layer comprising 10 mg of metallic chromium and 9 mg, in terms of metallic chromium, of hydrated chromium oxide, per m$^2$ of the substrate, without forming the amorphous metal base layer.

Each of the samples A, B and C was heated at a temperature of 210° C. for various times in the range of from 0 to 30 minutes, without being coating with a paint (lacquer).

After the heating procedure was completed, the amount of the Sn-Fe alloy formed in the tin intermediate layer in each sample was determined by dissolving the coating layer entirely in an acid aqueous solution and by determining the amount of iron contained in the resultant acid solution.

The drawing clearly shows that the sample B, which is the chromium-plated steel strip of the present invention, is significantly resistive to the formation of the Sn-Fe alloy in the intermediate layer. In the sample C, containing no amorphous metal base layer, the formation of the Sn-Fe alloy was larger than that of sample B. In the sample A, having cystalline nickel base layer, the formation of the Sn-Fe alloy was larger than that of sample C. That is, the crystalline nickel base layer promoted the formation of the Sn-Fe alloy.

Each of the samples A, B and C heated at a temperature of 210° C. for 30 minutes was subjected to a seamwelding process. The sample B exhibited an excellent seamweldability. That is, when a welding current was applied to the sample B at a current density great enough to form a continuous nugget in the weld and to obtain a satisfactory welding strength, no expulsions and surface flashes were formed in the weld. In the case of the sample C, a very small number of expulsions and surface flashes were formed. However, in the sample A, a number of expulsions and surface flashes having a length of from 0.5 to 1.5 mm were formed in the direction of right angle to the welding direction. Additionally, it was found that the range of the current density, large enough to obtain a satisfactory weld in the sample B, is broader than that in the sample C.

Generally, the amount of the tin intermediate layer is variable depending on the use of the resultant chromium-plated steel strip, the type of treatment to be applied to the steep strip, and the amount and composition of the surface layer to be formed on the intermediate layer. For example, if it is necessary that the surface layer contains 20 mg/m$^2$ or more of metallic chromium, it is preferable that the tin intermediate layer be present in an amount such that, after the usual paint coating and heating procedures are applied thereto, the amount of the free tin in the intermediate layer is 0.3 g/m$^2$ or more. In this case, the amorphous metal base layer is effective for enhancing the weldability, the corrosion resistance and the rust resistance of the resultant product.

The resultant product of the present invention can exhibit a satisfactory weldability even if a coating oil, for example, DOS (di-octyl sebacate) or CSO (cotton seed oil), is applied onto the surfaces of the products, as long as the amount of the applied coating oil is 10 mg/m$^2$ or less. The coating oil can be applied onto the surfaces of the product by any conventional coating method used in connection with the conventional can-forming materials.

SPECIFIC EXAMPLES

The following specific examples are presented for the purpose of clarifying the present invention. However, it should be understood that these are intended only to be examples of the present invention and are not intended to limit the scope of the present invention in any way.

In the examples, the properties of the products were measured as follows.

1. Seamweldability

Two pieces of the coated products were heated at a temperature of 210° C. for 20 minutes and, then, at a temperature of 190° C. for 10 minutes by using an electric oven. The heated pieces were welded to each other by using a W1MA type seamwelding machine made by Soudronic Co., under the following conditions.

Frequency: 400 Hz
Overlap width: 0.8 mm
Speed of welding procedure: 50 m/min

During the seamwelding procedure, the formation of expulsions and surface flashes on the weld and the formation of nuggets in the inside of the weld were observed.

The impact strength of the weld was measured by using a Du Pont type impact test machine in which an impacting weight having a weight of 500 g and a punch with an impacting end thereof having a diameter of 63 mm were used and the fall of the impacting weight was 50 cm.

2. Resistance to corrosion under the paint (lacquer) coating layer

A product is coated with 55 mg/dm$^2$ of an epoxy-phenol type lacquer and heated at a temperature of 210° C. for 10 minutes. A piece of the lacquer-coated product was subjected to a cross knife-cut test. That is, the lacquer coating layer was cross hatched in a chequer pattern so as to form scratches each having a width of 10 microns and a depth of 15 microns. The cross hatched piece was immersed in an aqueous solution containing 1.5% by weight of citric acid and 1.5% by weight of NaCl at a temperature of 50° C. for 3 days. The degree of the spread of rust from the scratches was observed.

3. Resistance to sulfide

A test piece of the same lacquer coated product as that above-mentioned was subjected to a usual can end forming procedure in which the can end had a diameter of 2 1/12 inches. The test piece in the form of a can end was placed together with the meat of a mackerel in a can. The can was sealed with an other can end. The can was subjected to a retort treatment at a temperature of 120° C. for 90 minutes and, thereafter, allowed to stand at a temperature of 37° C. for one week. After removing the test piece from the can, the appearance of the test piece (can end) was observed.

4. NaCl solution retort property

The same test piece as that of the sulfide resistance test was prepared and subjected to the same can end forming procedure as that mentioned above. The test piece was subjected to a NaCl retort treatment by using a 3% NaCl aqueus solution at a temperature of 120° C. for 90 minutes, and, then, allowed to stand at a temperature of 50° C. for 5 days. Resistance to the NaCl retort was determined by applying a piece of adhesive tape onto a surface of the end portion of the test piece and, then, rapidly peeling the adhesive tape from the test piece. It was inspected whether or not a portion of the lacquer coating layer was removed from the test piece.

EXAMPLES 1 through 6

In each of the Examples 1 through 6, a cold rolled steel strip having a thickness of 0.21 mm was degreased and pickled by a usual method.

The descaled steel strip was subjected to a chemical plating process by using a plating aqueous solution containing 50 g/l of NiCl$_2$.6H$_2$O (nickel chloride), 10 g/l of NaPH$_2$O$_2$.H$_2$O (sodium hypophosphite), and 10 g/l of C$_6$H$_5$O$_7$Na$_3$.5H$_2$O (sodium citrate), at a temperature of 90° C. for 1 to 300 seconds.

Next, the resultant amorphous Ni-P alloy-plated steel strip was subjected to a usual cathodic tin-electroplating process by using a sulfate bath containing 28 g/l of Sn$^{++}$ and 20 g/l in terms of sulfuric acid of a free acid, at a temperature of 45° C. at a current density of 30 A/dm$^2$ for 0.3 seconds.

Finally, the tin-plated steel strip was subjected to a cathodic electrolytic chromic acid treatment by using an aqueous solution containing 100 g/l of chromic acid anhydride and 1.0 g/l of sulfuric acid, at a temperature of 45° C. at a current density of 30 A/dm$^2$ for 0.15 seconds.

The amount and composition of the Ni-P alloy base layer, the amount of the tin intermediate layers and the amount and composition of the surface layer are indicated in Table 1.

Also, the product was subjected to the weldability test, corrosion resistance test, the sulfide stain resistance test and the NaCl solution retort test. The results of the tests are indicated in Table 1.

EXAMPLES 7 and 8

In each of the Examples 7 and 8, the same procedures as those described in Example 1 were carried out, except that the amorphous Ni-P alloy base layer was prepared electrolytically using an aqueous solution containing 245 g/l of NiSO$_4$.6H$_2$O (nickel sulfate), 45 g/l of NiCl$_2$.6H$_2$O, 30 g/l of H$_3$BO$_4$ (boric acid) and 10 g/l of H$_3$PO$_4$ (phosphorous acid) at a temperature of 50° C. at a current density of 10 A/dm$^2$ for 0.6 seconds. The results are indicated in Table 1.

EXAMPLES 9 through 11

In each of Examples 9 through 11, the same procedures as those mentioned in Example 1 were carried out, except that the base layers were composed of an amorphous Ni-B alloy which was chemically plated by using an aqueous plating bath containing 30 g/l of NiCl$_2$.6H$_2$O, 60 g/l of H$_2$NCH$_2$CH$_2$NH$_2$ (ethylene diamine), 45 g/l of NaOH (sodium hydroxide) and 0.6 g/l of NaBH$_4$ (sodium borohydride), at a temperature of 85° C. for 3 to 5 seconds.

The results are indicated in Table 1.

COMPARATIVE EXAMPLE 1

The same procedures as those described in Example 1 were carried out, except that no amorphous Ni-P alloy base layer was formed on the surface of the steel strip.

The results are shown in Table 1.

COMPARATIVE EXAMPLES 2 and 3

In each of the Comparative Examples 2 and 3, the same procedures as those described in Example 1 were carried out, except that the base layer was composed of nickel alone electrolytically plated on the surface of the steel strip. The nickel base layer was prepared by using an electrolytic plating bath containing 245 g/l of NiSO$_4$.6H$_2$O, 45 g/l of NiCl$_2$.6H$_2$O and 30 g/l of H$_3$BO$_3$, at a temperature of 45° C. at a current density of 10 A/dm$^2$ for 0.3 to 1.1 seconds.

The results are shown in Table 1.

TABLE 1

| Example No. | Base layer Amount of Ni (mg/m$^2$) | Base layer Amount of P or B (mg/m$^2$) | Intermediate layer Amount of Sn g/m$^2$ Upper surface | Intermediate layer Amount of Sn g/m$^2$ Lower surface | Surface layer Amount of metallic chromium (mg/m$^2$) | Surface layer Amount of hydrated chromium oxide (mg/m$^2$) | Soudronic weldability Number of expulsions per 10 cm of weld | Soudronic weldability Impact strength | Resistance to corrosion (width of corrosion, mm) | Resistance to sulfide | Resistance to NaCl retort |
|---|---|---|---|---|---|---|---|---|---|---|---|
| Example |  |  |  |  |  |  |  |  |  |  |  |
| 1 | 8 | p<1 | 0.5 | 0.5 | 8~11 | 8~12 | 8~12 | no crack no peel | 0.08 | Excellent | Good |
| 2 | 29 | p 3 | 0.5 | 0.5 | " | " | <3 | no crack no peel | 0.05 | " | " |
| 3 | 33 | p 3 | 0.5 | 0.5 | " | " | <3 | no crack no peel | " | " | " |
| 4 | 52 | p 6 | 0.5 | 0.5 | " | " | <3 | no crack no peel | " | " | Excellent |
| 5 | 180 | p21 | 0.5 | 0.5 | " | " | <3 | no crack no peel | " | " | " |
| 6 | 420 | p50 | 0.5 | 0.5 | " | " | 5~10 | no crack no peel | " | Good | " |
| 7 | 44 | p 5 | 0.5 | 0.5 | " | " | <3 | no crack no peel | " | Excellent | " |
| 8 | 56 | p 6 | 0.5 | 0.5 | " | " | <3 | no crack no peel | " | " | " |
| 9 | 25 | B≈1 | 0.2 | 0.8 | 15~17 | 10~12 | <3 | no crack no peel | " | " | " |
| 10 | 33 | B≈2 | 1.5 | 1.5 | 25~30 | 10~12 | <3 | no crack no peel | 0.08 | " | " |
| 11 | 33 | B≈2 | 2.8 | 2.8 | 50~55 | 17~19 | 3~5 | no crack no peel | 0.10 | " | " |
| Comparative Example |  |  |  |  |  |  |  |  |  |  |  |
| 1 | 0 | 0 | 0.5 | 0.5 | 8~11 | 8~12 | 8~12 | no crack no peel | 0.08 | " | Good |
| 2 | 45 | 0 | 0.5 | 0.5 | " | " | 8~12 | no crack no peel | 0.05 | " | Excellent |
| 3 | 220 | 0 | 0.5 | 0.5 | " | " | >12 | no crack no peel | " | Good | " |

From Table 1, it is clear that the products of the present invention exhibited excellent Soudronic seam-weldability. That is, it was found that, in the products of the present invention, the formation of expulsions in the weld was very small, especially for amounts of P or B of 1–21 mg/m$^2$ of said substrate, weld nuggets were formed along the welding direction, and the ends of the nuggets were overlapped on reach other so as to form a satisfactory weld. However, when the products of the comparative examples were subjected to the seamwelding process, a number of expulsions were produced.

Also, the products of the present invention exhibited satisfactory resistance to corrosion, sulfide and NaCl retort.

We claim:

1. A chromium-plated steel strip having excellent weldability and resistance to corrosion, comprising:
   a steel strip substrate;
   an amorphous metal base layer consisting essentially of Ni-P or Ni-B formed on said substrate in an amount of 3 to 500 mg per m$^2$ of said substrate;
   with P or B in an amount of 1-21 mg/m$^2$ of said substrate;
   an electroplated tin intermediate layer formed on said base layer in an aqueous bath in an amount of 2.8 g or less per m$^2$ of said substrate, and;
   a surface layer coated on said intermediate layer, said surface layer containing 5 to 150 mg of metallic chromium and 3 to 30 mg of hydrated chromium oxide per m$^2$ of said substrate.

2. The chromium-plated steel strip as claimed in claim 1, wherein said amorphous metal base layer consists essentially of a plated amorphous Ni-P alloy.

3. The chromium-plated steel strip as claimed in claim 1, wherein said amorphous metal base layer consists essentially of a plated amorphous Ni-B alloy.

4. The chromium-plated steel strip as claimed in claim 1, wherein the weight of said base layer is in the range of from 15 to 50 mg per m$^2$ of said substrate.

5. The chromium-plated steel strip as claimed in claim 1, wherein the weight of said tin intermediate layer is in the range of from 0.2 to 2.8 g per m$^2$ of of said substrate.

* * * * *